US008990835B2

(12) United States Patent
Labéjof et al.

(10) Patent No.: US 8,990,835 B2
(45) Date of Patent: Mar. 24, 2015

(54) DATA DISTRIBUTION SYSTEM BASED ON THE EXCHANGE OF ASYNCHRONOUS MESSAGES

(75) Inventors: Jonathan Labéjof, Palaiseau (FR); Philippe Merle, Villeneuve d'Ascq (FR); Antoine Léger, Palaiseau (FR); Lionel Seinturier, Villeneuve d'Ascq (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/554,973

(22) Filed: Jul. 20, 2012

(65) Prior Publication Data

US 2013/0024874 A1 Jan. 24, 2013

(30) Foreign Application Priority Data

Jul. 22, 2011 (FR) ...................................... 11 02295

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *H04L 29/08* | (2006.01) | |
| *G06F 9/445* | (2006.01) | |
| *G06F 9/54* | (2006.01) | |

(52) U.S. Cl.
CPC *H04L 67/26* (2013.01); *G06F 8/67* (2013.01); *G06F 9/542* (2013.01)
USPC ........................................................ 719/315

(58) Field of Classification Search
None
See application file for complete search history.

(56) References Cited

U.S. PATENT DOCUMENTS

| 6,895,586 | B1* | 5/2005 | Brasher et al. ................ 719/313 |
| 7,882,253 | B2* | 2/2011 | Pardo-Castellote et al. .. 709/230 |
| 2002/0178099 | A1* | 11/2002 | Young ............................. 705/36 |

(Continued)

OTHER PUBLICATIONS

Gerardo Pardo-Castellote, "OMG Data-Distribution Service: Architectural Overview," 2003, IEEE, Proceedings of the 23rd International Conference on Distributed Computing Systems Workshops (ICDCSW'03), pp. 1-7.*

(Continued)

*Primary Examiner* — H S Sough
*Assistant Examiner* — William C Wood
(74) *Attorney, Agent, or Firm* — Knobbe Martens Olson & Bear LLP

(57) ABSTRACT

A data distribution system based on the exchange of asynchronous messages in publication/subscription mode, for the exchange of data according to various qualities of service between a transmitter running a data supplying application and one receiver running a data receiving application is disclosed, which transmitter and receiver are interconnected by a communication network, via communication objects. Communication objects provide one programming interface to exchange messages. In one aspect, a communication object is broken down into a number of components comprising a type-1 component comprising the programming interface, and at least one type-2 component adapted to control information related to the type-1 component and providing the operations responsible for functionalities reconfigurable during runtime, which communication object has a mechanism for providing runtime reconfiguration requests to the at least one type-2 component, so as to allow for the reconfiguration during runtime of a functionality associated with the communication object.

13 Claims, 4 Drawing Sheets

(56) References Cited

U.S. PATENT DOCUMENTS

2003/0088707 A1* 5/2003 Barnhouse et al. ........... 709/313
2008/0256553 A1* 10/2008 Cullen .......................... 719/313
2009/0171996 A1 7/2009 Laxminarayanan
2010/0333111 A1 12/2010 Kothamasu et al.

OTHER PUBLICATIONS

Bogumil Zieba et al., "Preservation of Correctness During System Reconfiguration in Data Distribution Service for Real-Time Systems (DDS)," 2006, Proceedings of the 26th IEEE International Conference on Distributed Computing Systems Workshops, pp. 1-6, retrieved from http://ieeexplore.ieee.org/stamp/stamp.jsp?tp=&arnumber=1648920 on Jan. 13, 2014.*

Marco Castaldi et al., "A Lightweight Infrastructure for Reconfiguring Applications," SCM, 2003, pp. 231-244, retrieved from http://download.springercom/static/pdf/375/chp%253A10.1007%252F3-540-39195-9_17.pdf?auth66=1390678285_41d6c99276b0bc5e333897ed4565988a&ext=.pdf on Jan. 23, 2014.*

Search Report dated Apr. 24, 2012 issued for French Application No. FR 11 02295.

Data Distribution Service for Real-time Systems Version 2.1, Object Management Group, Jan. 2007, XP00790523, http://www.omg.org/specidds/1.2/pdf Apr. 18, 2012.

Gamma et al., Design Patterns: Elements 1-8 of Reusable Object-Oriented Software Passage, Sep. 1, 1999, Addison-Wesley Professional Computing Series, Addison-Wesley, Boston, Mass., pp. 163-173, 223, XP002334094, ISBN: 978-0-201-63361-0.

* cited by examiner

DATA DISTRIBUTION SYSTEM BASED ON THE EXCHANGE OF ASYNCHRONOUS MESSAGES

FIELD

This invention concerns a data distribution system based on the exchange of asynchronous messages in publication/subscription mode, allowing for the exchange of data according to various qualities of service between at least one transmitter adapted to run a data supplying application and one receiver adapted to run a data receiving application, said transmitter and receiver being interconnected by means of a communication network.

The invention applies in particular to distributed systems that connect applications operated by various nodes of a communication network via messages that transport the data.

BACKGROUND

In particular, the message exchange model known as "Data Distribution Service" (DDS), standardized by the organization "Object Management Group" (OMG) is known, described, in particular, in the document "Data Distribution Service for Real-Time System", version 1.2, January 2007. DDS is a middleware that specifies an advanced data exchange technique by means of asynchronous messages, which allows for near real-time data distribution and various levels of quality of service, adapted for on-board systems. DDS is a data-centric system that manages the targeted distribution, i.e., addressing and serializing/de-serializing the data.

The DDS system is applied in a domain, which groups a number of machines, or nodes, distributed on the communication network and sharing common data. The system allows for the publication of data by means of data publishing applications, or publishers, subscription to the data shared by data subscribing applications, or subscribers, the modification of shared data, and the reporting of such modifications to the other machines of the domain. A node of the domain may be a publisher, subscriber, or both at the same time.

Because of the asynchronous publication/subscription operation mode, the various applications of a domain do not need to know each other. The DDS system defines a mechanism for discovering the services provided by the various applications, mechanisms for specifying the behavior during the sending and receiving of messages. The DDS system defines communication entities or objects that provide programming interfaces for message exchange, and offers approximately twenty qualities of service (QoS), allowing for control of the distribution of the data, such as the lifetime of a datum on the network, the lifetime of a datum on a node of the system, the persistence of a datum on the network, the reliability of the data transmission on the communication network, a minimum and/or maximum transmission time. Each entity has a group of associated qualities of service.

The DDS system is designed to offer flexibility and to simplify the interactions of applications over a communication network.

However, the DDS system does not offer the possibility of runtime evolution. In fact, once the DDS system is deployed on a group of applications of a distributed network and run, numerous qualities of service, such as the lifetime of a datum on a node of the system, are fixed, and cannot be modified.

For example, if a new version of DDS with new qualities of service is available, an update of a DDS system already deployed requires the current status or context of the communication objects on each node of the system to be saved before the version currently operating is stopped, followed by the installation of the new version and the insertion of the saved data into the new version. This necessitates the intervention of a developer at the level of the program code of the new version.

It would be useful to have the possibility for an easier development of a DDS-type data distribution system based on asynchronous message exchange in publication/subscription mode.

SUMMARY

To this end, the invention proposes a data distribution system based on the exchange of asynchronous messages in publication/subscription mode, allowing for the exchange of data according to various qualities of service between at least one transmitter adapted to run a data supplying application and one receiver adapted to run a data receiving application, said transmitter and receiver being interconnected by means of a communication network, via communication objects, with each communication object providing a programming interface to exchange messages according to the distribution system.

The data distribution system is characterized in that a communication object is broken down into a number of components, including a component of a first type comprising the programming interface, and at least one component of a second type capable of controlling information related to the component of the first type, and providing operations responsible for functionalities that are reconfigurable during runtime, the communication object having a mechanism for the sending of a reconfiguration request during runtime to the at least one component of the second type, so as to allow for the reconfiguration during runtime of a functionality associated with the communication object.

Advantageously, such a breakdown of a communication object into a number of components, of which the type-2 components which are modifiable, allows for reconfiguration of the functionalities of a node during runtime, only modifying what is necessary, in particular, the addition or modification of the qualities of service offered. Additionally, this component architecture provides an easiness of integration into distributed systems already based on components, e.g., according to the CCM model (CORBA component model) or SCA model (Service Component Architecture).

The data distribution system according to the invention may have one or more of the following characteristics:
   each communication object has a predetermined set of associated qualities of service, and reconfiguration during runtime comprises the addition and/or modification during runtime of a quality of service associated with the communication object.
   one such type-2 component is adapted to save contextual information related to at least one element contained in the type-1 component;
   one such piece of contextual information is a value corresponding to a quality of service associated with the communication object;
   the breakdown comprises a plurality of type-2 components, including a rule-management component, a communication component, a content discovery/addition/deletion component, and a reconfiguration management component;
   a communication object contains at least one target communication object that inherits from that communication object, one such target communication objects being also broken down into a plurality of components, a target communication object being capable of changing parent communication objects upon running.

In another aspect, the invention also concerns a method for the reconfiguration of functionalities of a data distribution system based on asynchronous message exchange in publication/subscription mode, such as briefly described above, during runtime on a communication network.

This method is characterized in that it includes the following steps, executed by a communication object:
creation of a composite associated with the communication object, containing a type-1 component and at least one type-2 component adapted to control information related to the type-1 component and providing operations responsible for functionalities that are reconfigurable during runtime.
verification of the end of the execution of the communication object, and
updating of the properties of the type-2 component in accordance with the communication object.

According to one characteristic, the method for reconfiguration of the functionalities of a data distribution system includes, inter alia, in the case of a modification of a quality of service associated with a communication object, the following steps:
receipt, by the type-1 component of the communication object, of a new quality of service value associated with the quality of service to be modified,
redirection of the new quality of service value to a type-2 component associated with the communication object, and
implementation of the quality of service corresponding with the new quality of service value by the type-2 component.

BRIEF DESCRIPTION OF THE DRAWINGS

Other characteristics and benefits of the invention can be seen from the description provided below, by way of example only, in reference to the attached drawings, of which.

DETAILED DESCRIPTION

The invention will be described below in its application with the OMG DDS message exchange distribution system. Generally, the invention applies to all message-based data distribution systems in publication/subscription mode.

Figure 1:
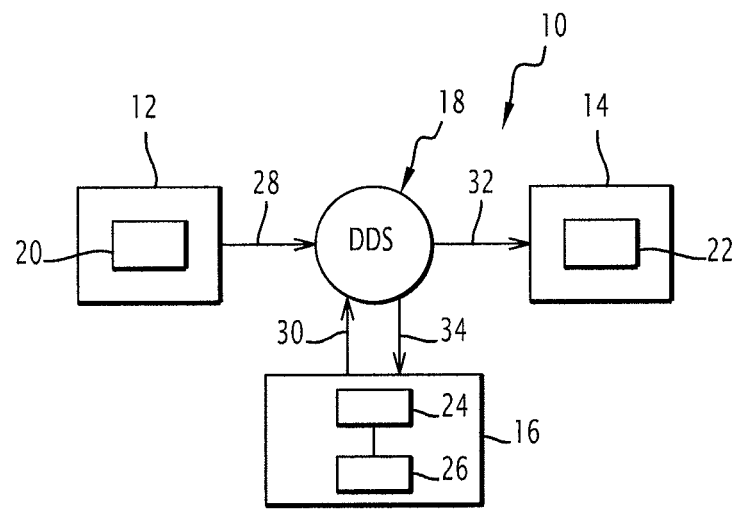
FIG. 1 is a schematic diagram illustrating a group of transmitters/receivers adapted to communicate according to the data distribution system of the invention.

FIG. 1 is a schematic representation of a group of devices 10 forming the nodes 12, 14, 16 of a distributed network adapted to communicate using a DDS message-based system 18. In this example, the node 12 is a transmitter node comprising a publisher 20, the node 14 is a receiver node comprising a subscriber 22, and node 16 is both a transmitter and a receiver, comprising both a publisher 24 and a subscriber 26. These nodes are part of a single DDS domain; thus, the respective applications 20, 22, 24, and 26 exchange data.

The application 20 and the application 24 transmit or publish data via messages 28, 30. The applications 22 and 26 can recover the data published via the subscription messages 32, 34.

To better describe the operation of the system, consider the following very simple example: application 20 regularly publishes the local temperature T1 of a predetermined location, e.g., a specific room of a building, in degrees Fahrenheit. This datum has an associated quality of service (QoS), which is its term of validity on the network. During this term of validity, the application 26 recovers the datum T1 in Fahrenheit and transmits it to the application 24, which converts it into degrees Celsius, and publishes the datum T1 in degrees Celsius via a corresponding message 30. The application 22 recovers the temperature T1 in degrees Celsius via the message 32.

Obviously, the example above is for explanatory purposes only. More generally, such a communication system based on messages is intended for application in numerous industrial fields requiring control and organization of activities in real time, such as aeronautics or telecommunications.

Figure 2:
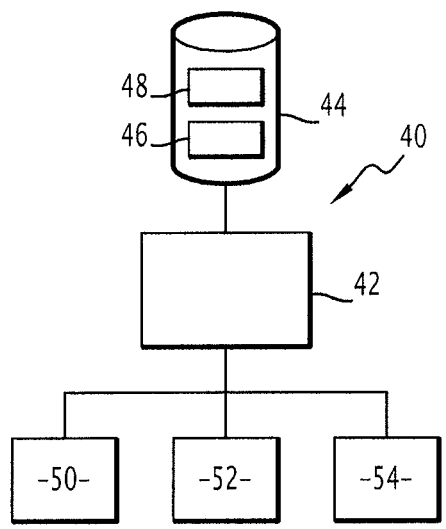
FIG. 2 is a schematic diagram of a device executing the invention.

A node of a distributed network is a device 40, as shown in FIG. 2, e.g., a computer, and comprises a processor 42, adapted to manage the various functional modules of the device 40, a storage space 44, suited for storing, in particular, the software module 46, containing executable code adapted to run a functionality reconfiguring method of a data distribution system, and a memory 48, adapted to store the entities of the data distribution system and the associated data, in particular the breakdown of the communication object into components according to the invention.

The device 40 further includes means of communication 50 with a communication network, e.g., Ethernet or an 802.11 wireless network, allowing the transmitter and receiver nodes of the domain to communicate physically. The device 40 further comprises means of capturing data 52, and, optionally, means of display 54.

As mentioned above, the invention is described in particular in its application to the DDS data distribution system.

The DDS system consists of two layers, a low-level DCPS (Data-Centric Publish-Subscribe Model) layer managing data and their qualities of service, and a high-level DLRL (Data Local Reconstruction Layer) for interfacing with high-level applications. The DCPS layer defines generic communication objects known as entities, and all DDS communication objects are specializations of the object "Entity". Each entity has a number of associated QoS, a generic listener mechanism adapted to report the availability of data related to the entity, and an associated status, Status condition. Various specializations of DCPS entities are defined in version 1.2 of DDS, in particular Domain Publisher and Subscriber, which provide programming interfaces.

According to the DDS syntax standardized in version 1.2, the DDS entity and its predefined specializations are specified in an object programming model.

Figure 3:
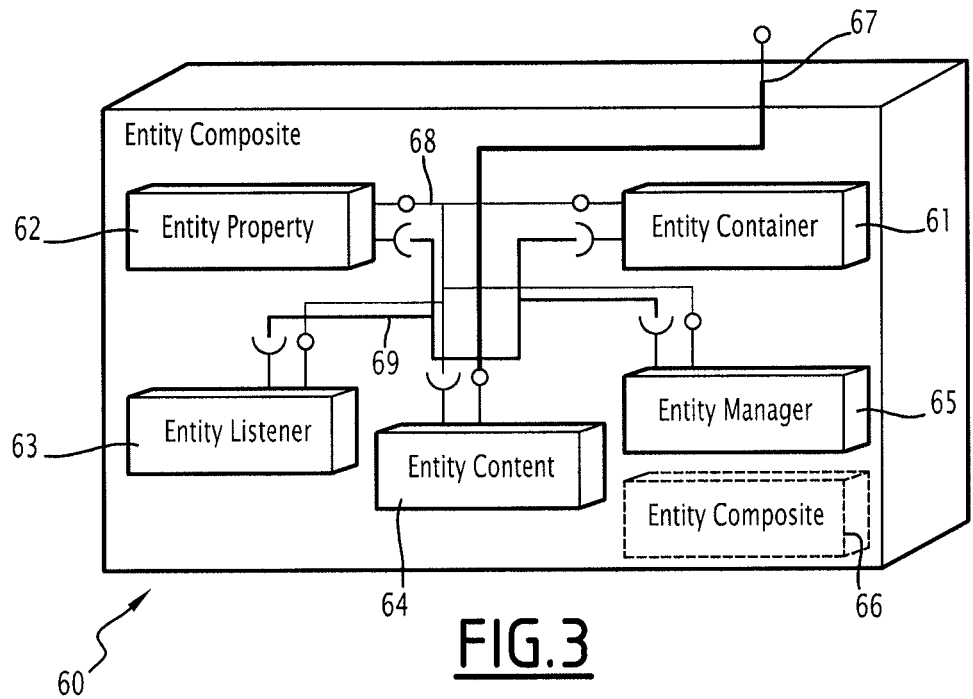
FIG. 3 is a diagram showing the breakdown into components of a communication object according to the invention.

FIG. 3 shows the breakdown of a DDS entity according to a component model, which separates the functional aspect related to the application using the DDS entity, and the management logic of the DDS entity, thus allowing for runtime updating of certain functionalities of the DDS entity. Furthermore, these components are reflexive, i.e., they implement the operations which are responsible for reconfigurable functionalities during runtime. Thus, these components can self-modify without the need for a complete installation of a new version by a programmer.

FIG. 3 shows a component model "EntityComposite" 60, comprising a component of a first type corresponding to functional components, component "EntityContainer" 61; and four components of the second type corresponding to non-functional components: the component "EntityProperty" 62, the component "EntityListener" 63, the component "EntityContent" 64, and the component "EntityManager" 65.

The type-1 component 61 takes back the programming interface of the entity "Entity" as already defined by the DDS system, thus ensuring the compatibility with the DDS specification.

The other components, called type-2 components, add an intermediate logic and management layer, and are capable to controlling information related to the type-1 component, thus allowing for an update by the addition or modification of the quality of service associated with the entity, and more generally the reconfiguration during runtime of the functionalities of the entity.

Thus, the type-2 component "EntityProperty" 62 manages all of the quality of services or other functional properties of the entity, such as its name.

The type-2 component "EntityListener" 63, similar to the object Listener defined in DDS, is a communication component which implements the notification of the presence and the availability of pertinent data for the application that runs the entity, and the transmission of error messages, e.g., on the transmission or the receipt of data, but also any local event related to the "EntityComposite" 60, such as a change in a property or the start/stop of another child component.

The type-2 component "EntityContent" 64 allows browsing through "EntityComposite" 60 in order to discover its content at the component level. Component 64 is the first component accessible from outside of "EntityComposite" 60, and is directly connected to all the child components of "EntityComposite" 60. Component 64 also manages the addition or deletion of a type-1 or type-2 component in EntityComponent 60.

The type-2 component "EntityManager" 65 manages the life cycle of "EntityComposite" 60 and its child components. In particular, component 65 is capable of making "EntityComposite" 60 unavailable and to restart it, and also implements operations allowing for its reconfiguration.

The dotted component 66 represents another "EntityComposite", in which the entity associated is the target of a composition relationship with the entity associated with the element 60, in the DDS architecture. In terms of ease, the effect of this breakdown into components is to allow a target element of such a relationship to change parents during runtime, maintaining its own properties, in a new context provided by a new parent.

The relationships between the components are also shown schematically in FIG. 3. Each component has an associated programming interface (API). The relationships between the components implemented via the API, such as service provision and consumption relationships, can also be seen.

The component "EntityContent" 64 is the sole component that provides a service to the outside, represented by numeral 67 in FIG. 3. To this end, the component 64 is adapted to receive data from all of the other components. This is represented by numeral 68 in FIG. 3. The component 64 is a consumer of services originating from all of the other components.

The other components, i.e., the type-1 component 61 and the type-2 components 62, 63, and 65, are simultaneously providers 68 and consumers 69 of services originating from other modules.

Due to this breakdown into components, it is possible to update or reconfigure, during runtime, a DDS system already deployed on a set of nodes of a network. For example, as explained in greater detail below, a reconfiguration request for a quality of service associated with the entity is received by the "EntityContainer" 61, which redirects it to "EntityProperty" 62, via the service exchanges 68, 69. Thus, the composite 60 includes a mechanism for providing reconfiguration requests in runtime to the type-2 component "EntityProperty" 62.

Figure 4:
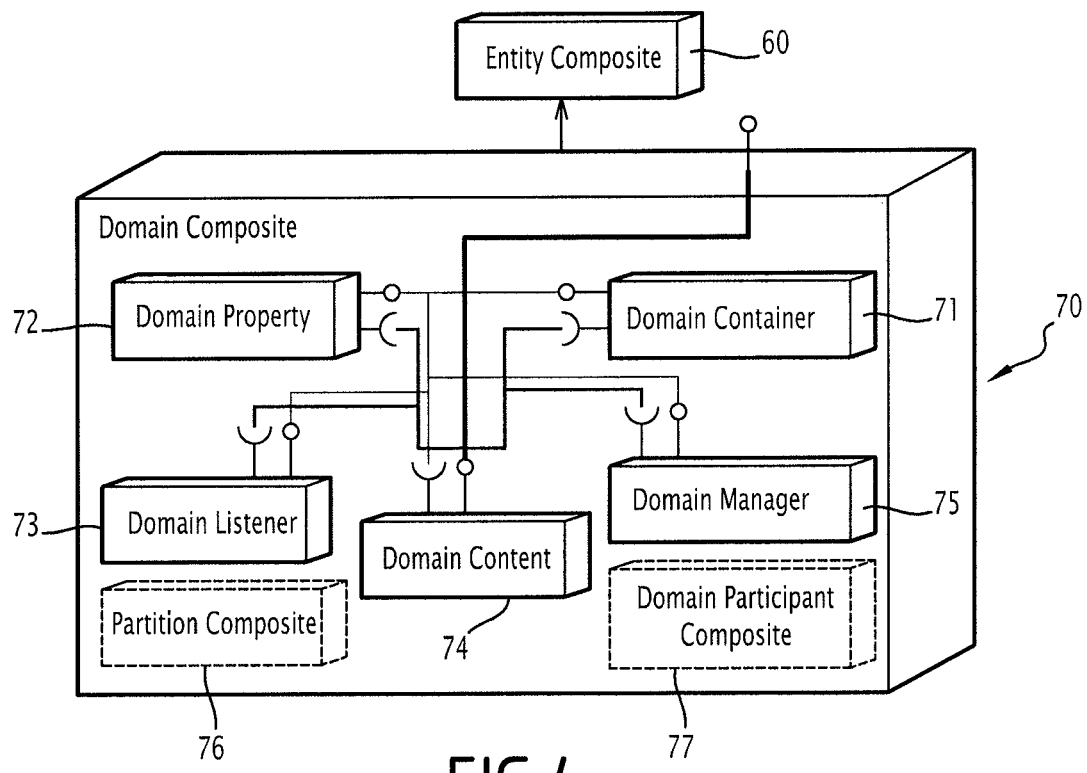
FIG. 4 is a diagram showing an example of a communication object DomainComposite according to the invention.

FIG. 4 is a schematic representation of the breakdown into components of an entity "DomainComposite", which is a specialization or inheritance of "EntityComposite". Thus, the specialization mechanism proposed in DDS is easily transposed with the breakdown into type-1/type-2 components.

The entity "DomainComposite" 70 of FIG. 4, corresponding to the entity "Domain" of DDS, is capable of defining a domain, i.e., a distributed network of nodes sharing data, and comprises the type-1 component, or functional component, "DomainContainer" 71 which is a specialization of "EntityContainer" 61, and the type-2, or non-functional components:

"DomainProperty" 72, which is a specialization of "EntityProperty" 62,

"DomainProperty" 73, which is a specialization of "EntityListener" 63,

"DomainProperty" 74, which is a specialization of "EntityContent" 64, and "DomainProperty" 75, which is a specialization of "EntityManager" 65, Additionally, the entity "DomainComposite" 70 is connected to one or more entities "PartitionComposite" 76 and to one or more entities "DomainParticipantComposite" 77 by the composition relationship of the DDS architecture. In fact, in addition to the definition of domains grouping nodes of a network shown here as "DomainParticipantComposite" 77, DDS also offers the possibility of defining specified logical partitions by means of an entity "PartitionComposite".

Figure 5:
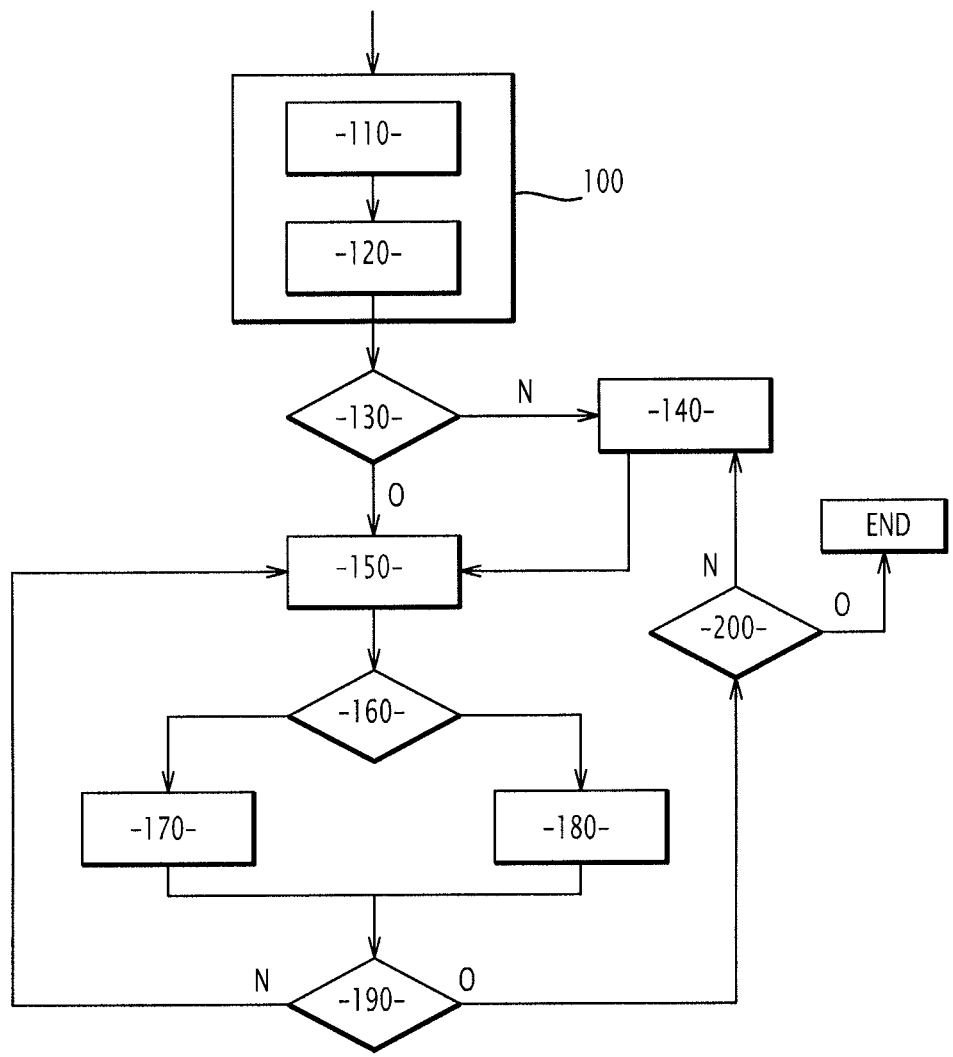
FIG. 5 is a flow chart of a method for reconfiguring the functionalities of a data distribution system according to the invention.

FIG. 5 is a diagram illustrating the implementation of a method for deploying and reconfiguring a data distribution system using the breakdown into components of communication objects according to the invention, implemented by the processor 42 under the control of the software module 48 in a device 40 that implements the invention.

The method described in FIG. 5 applies both to a first case (case A), in which a data exchange system according to the classic DDS specification is already deployed on a set of nodes of a network and the data are actually being distributed, and a second case (case B), in which a new data exchange system is directly implemented with a model broken down into components according to the invention.

The method starts with a first step 100 of creating the component model "EntityComposite", which includes a first sub-step 110 of creating the type-2 components and a second sub-step 120 of creating the type-1 component "EntityContainer", which implements the API of the corresponding DDS entity. Thus, "EntityContainer" is ready to host a DDS entity, and the other type-2 components are adapted to complete the implementation of the DDS entity.

In step 130, it is then verified whether the application implemented by the component "EntityContainer" is running. If the application is running, step 130 is followed by a step 140, ending the runtime of the application run by the component "EntityContainer".

If the application is detected to be inactive in the test of step 130 or following the stop in step 140, the following step is step 150, obtaining the DDS entity to be integrated into the component model, whether an existing entity in case A or a new entity in case B.

Step 160 runs a test to determine whether the DDS entity obtained is an existing entity or not.

If, in case A, the entity is an existing entity, the properties of each of the type-2 components are completed in step 170 based on the properties of the existing entity in order to restore a current state or context of the application onto which the component model will be automatically grafted. In case of failure, the component "EntityContainer" remains unavailable, and the reconfiguration is carried out manually, by modifying certain properties of the type-2 components.

In the case of a new entity, step 160 is followed by step 180, initializing the properties of the type-2 components based on the application.

The two steps 170 and 180 are followed by a step 190 of verifying the state of the execution of the component "EntityContainer".

If the component is not running, step 190 is followed by step 150, described above.

If the component "EntityContainer" has been restarted and is running, the test 190 is followed by a test 200 for verifying whether the model "EntityComposite" created comprises a DDS entity. In the event of a positive response, it continues running and the deployment and reconfiguration process ends. In the event of a negative response, step 200 is followed by step 140 described above, stopping the execution.

Figure 6:
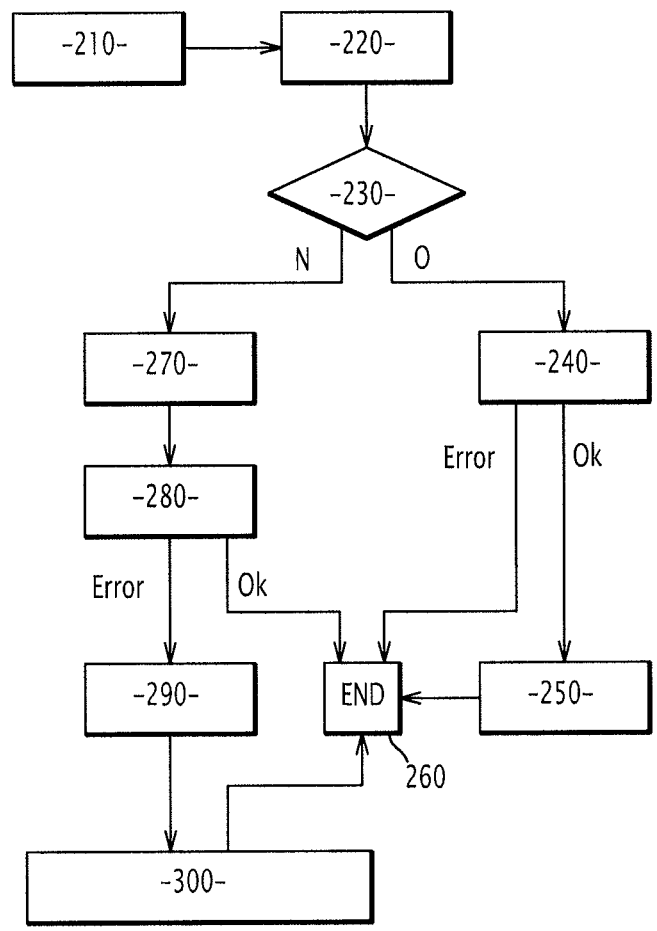
FIG. 6 is a flow chart of a method for modifying a quality of service associated with a communication object according to the invention.

FIG. 6 is a diagram illustrating the implementation of a method for modifying a quality of service associated with a communication object broken down into components according to the invention, implemented by the processor 42 under the control of the software module 48 in a device 40 that implements the invention.

In this example, a quality of service Q associated with the communication object is set at the value Q. For example, consider a change in the persistence in memory of a datum, e.g., by changing the value of the persistence to 0, corresponding to the storage of the datum in the RAM memory, to 1, corresponding to the storage of the datum in the permanent memory, e.g., in a file or database, allowing the datum to be retrieved after stopping and restarting the system. In a first step 210, the type-1 component or functional component ("EntityContainer" 61 of FIG. 4) receives an update request for the quality of service Q to the value QV.

The update request for the quality of service is redirected from the type-1 component "EntityContainer" to the type-2 component "EntityProperty". Thus, a runtime reconfiguration information provision or updating mechanism is run in the communication object.

In step 220, the component "EntityProperty" receives the update request for the quality of service Q to the value QV.

Step 220 is followed by testing step 230, consisting of testing whether the component "EntityProperty" is able to manage the implementations QVI corresponding to the quality of service Q.

In the event of a positive response to the test 230, in accordance with the breakdown into components disclosed by the invention, the component "EntityProperty" manages both the values and the implementations of the quality of service Q. In this case, the testing step 230 is followed by a step 240, in which the component "EntityProperty" carries out the change in implementation of the quality of service Q with value QV. In the example of changing the persistence value, the component "EntityProperty" manages the enhancement of the implementation of the persistence with a storage in a file.

If no error is found ("OK" branch), the change in implementation associated with the quality of service has been successfully carried out, and step 240 is followed by a step 250, in which the value QV of the quality of service Q is stored in the component "EntityProperty". If an error is raised in step 240 for the change in the implementation, then step 240 is followed by final step 260. Optionally, an error is raised allowing for a manual intervention by a programmer.

In the event of a negative response to the test 230, the test is followed by the step 270, in which, like step 250 above, the value QV associated with the quality of service Q is stored in the component "EntityProperty". This is the case where the component "EntityProperty" only manages the quality of service value, but not its implementation, which continues to be managed by the component "EntityContainer". In this case, at the time that the quality of service value equal to QV is stored in the component "EntityProperty", there is a difference between this value (e.g., datum stored in a file, persistence=1), and the value actually implemented, which is the above value (e.g., temporary datum, persistence=0).

Step 270 is followed by step 280, in which the implementation of the new quality of service value is redirected to the component "EntityContainer".

If the component "EntityContainer" is able to modify the implementation of the quality of service, step 280 is followed by final step 260.

If the implementation of the quality of service in the component "EntityContainer" is static and non-modifiable, an error is raised, and step 280 is followed by step 290, reconfiguring "EntityContainer" by means of the component "EntityManager".

All values related to the elements of the component "EntityContainer" are stored in the component "EntityProperty". For the quality of service Q, it is the new desired value QV that is stored in the component "EntityProperty"; thus, the new component "EntityContainer" will be initialized with this value.

The new "EntityContainer" is created in step 300 with the values stored in the component "EntityProperty", the properties stored in "EntityProperty", and the properties and values of component "EntityListener".

This new component "EntityProperty" implements the quality of service Q with the value QV, as requested.

The process ends in step 260.

What is claimed is:

1. A data distribution system based on the exchange of asynchronous messages in publication/subscription mode, comprising at least one transmitter, at least one receiver, a data supplying application, a data receiving application, a communication network, and at least one communication object, allowing for the exchange of data according to various qualities of service between at least one transmitter adapted to run a data supplying application and the at least one receiver adapted to run a data receiving application, the transmitter and receiver being interconnected by a communication network comprising the at least one communication objects, with each communication object providing a programming interface to exchange messages according to the distribution system, wherein at least one of the communication objects is broken down into a plurality of components including a component of a first type which comprises the programming interface, and a plurality of components of a second type which are capable of controlling information related to the component of the first type and provide operations responsible for functionalities reconfigurable during runtime, wherein one on the components of the second type allows browsing through the plurality of components of the communication object and allows adding and/or deleting a component of the first type or a component of the second type, wherein the communication object has a mechanism for sending a reconfiguration request during runtime to the at least one component of the second type which triggers a reconfiguration during runtime of a functionality associated with the communication object.

2. The data distribution system according to claim 1, wherein each communication object has a predetermined number of associated qualities of service, and the reconfiguration during runtime comprises the addition and/or the modification during runtime of a quality of service associated with the communication object.

3. The data distribution system according to claim 1, wherein the at least one component of the second type is configured to save contextual information related to at least one element included in the component of the first type.

4. The data distribution system according to claim 3, wherein at least one piece of contextual information is a value corresponding to a quality of service associated with the communication object.

5. The data distribution system according to claim 1, wherein the communication object comprise a plurality of components of the second type including a rule management component, a communication component, a content discovery/addition/deletion component and a reconfiguration management component.

6. The data distribution system according to claim 1, wherein the communication object comprises at least one target communication object, which inherits from the communication object, the target communication object being also broken down into a plurality of components and capable of changing of parent communication object during runtime.

7. A method for reconfiguring functionalities, during runtime on a communication network, in a data distribution system based on the exchange of asynchronous messages in publication/subscription mode, the method allowing for exchange of data according to various qualities of service between at least one transmitter adapted to run a data supplying application and at least one receiver adapted to run a data receiving application, the transmitter and the receiver being interconnected by the communication network comprising at least one communication object that provides a programming interface to exchange messages according to the data distribution system, the at least one communication object comprising a component of a first type having the programming interface and at least one component of a second type capable of controlling information related to the component of the first type of the communication object and proving operations responsible for the functionalities that are reconfigurable during runtime, the at least one communication object having a mechanism for sending a reconfiguration request during runtime to the at least one component of the second type so as to allow for a reconfiguration during runtime of a functionality associated with the communication object, wherein the method, executed by the at least one communication object, comprises:

creating a composite entity associated with the communication object, the composite entity including a component of the first type and a plurality of components of the second type capable of controlling information related to the component of the first type of the composite entity and providing operations responsible for the functionalities that are reconfigurable during runtime, wherein one of the components of the second type allows browsing through the plurality of components of the communication object and allows adding or deleting a component of the first type or a component of the second type, verifying the end of the execution of the communication object; and updating the properties of the component of the second type of the composite entity in accordance with the communication object.

8. The method according to claim 7, wherein the method further comprises, in the case of a modification of a quality of service associated with the communication object:

receiving, by the component of the first type of the communication object, of a new quality of service value associated with the quality of service to be modified;

redirecting the new quality of service value to the at least one component of the second type associated with the communication object; and executing an implementation of the quality of service corresponding with the new quality of service value by the component of the second type.

9. A data distribution system based on exchange of asynchronous messages in publication/subscription mode, the data distribution system comprising at least one transmitter, at least one receiver, a data supplying application, one or more processors and a data receiving application, the data distribution system further comprising:

a plurality of communication objects configured to be executed by the one or more processors, wherein the data distribution system allows for exchange of data according to various qualities of service between the at least one transmitter adapted to run the data supplying application and the at least one receiver adapted to run the data receiving application, wherein the transmitter and the receiver are data interconnected by the communication network and the communication objects, wherein at least one of the communication objects comprises a plurality of components including a functional component comprising a programming interface to exchange the messages according to the data distribution system, and a plurality of non-functional components which are configured to control information related to the functional component and provide operations responsible for functionalities reconfigurable during runtime, wherein the plurality of the non-functional components include at least one of: a rule management component, a communication component, a content discovery/addition/deletion component and a reconfiguration management component, wherein at least one of the communication objects has a mechanism for sending a reconfiguration request during runtime to at least one of the plurality of the non-functional components so as to allow for a reconfiguration during runtime of a functionality associated with at least one of the communication object.

10. The data distribution system according to claim 9, wherein each communication object has a predetermined number of associated qualities of service, and the reconfiguration during runtime comprises an addition and/or a modification during runtime of a quality of service associated with the communication object.

11. The data distribution system according to claim 9, wherein at least one of the plurality of the non-functional components is configured to save contextual information related to at least one element included in the functional component.

12. The data distribution system according to claim 11, wherein the at least one piece of contextual information is a value corresponding to a quality of service associated with each communication object.

13. The data distribution system according to claim 9, wherein each communication object comprises at least one target communication object, which inherits from the communication object, the target communication object being also broken down into a plurality of components and capable of changing parent communication object during runtime.

* * * * *

UNITED STATES PATENT AND TRADEMARK OFFICE
CERTIFICATE OF CORRECTION

PATENT NO. : 8,990,835 B2
APPLICATION NO. : 13/554973
DATED : March 24, 2015
INVENTOR(S) : Jonathan Labéjof Page 1 of 2

It is certified that error appears in the above-identified patent and that said Letters Patent is hereby corrected as shown below:

On the Title Page
    In column 2 (page 2, item 56) at line 3, Under Other Publications, change "springercom" to --springer.com--.
    In column 2 (page 2, item 56) at line 11, Under Other Publications, change "specidds" to --spec/dds--.

In the Specification
    In column 6 at line 33, Change "65," to --65.--.

In the Claims
    In column 8 at line 49, In Claim 1, after "on" delete "the".
    In column 8 at line 54, In Claim 1, after "for" delete "the".
    In column 8 at line 55, In Claim 1, after "between" insert --the--.
    In column 8 at line 56, In Claim 1, change "a" to --the--.
    In column 8 at line 57, In Claim 1, change "a" to --the--.
    In column 8 at line 58, In Claim 1, change "a" to --the--.
    In column 8 at line 59, In Claim 1, change "objects" to --object--.
    In column 8 at line 61, In Claim 1, after "exchange" insert --the--.
    In column 8 at line 61, In Claim 1, before "distribution" insert --data--.
    In column 8 at line 63, In Claim 1, after "wherein" insert --the--.
    In column 8 at line 63, In Claim 1, change "one of the" to --one--.
    In column 8 at line 63, In Claim 1, change "objects" to --object--.
    In column 9 at line 4, In Claim 1, change "on" to --of--.
    In column 9 at line 17 (approx.), In Claim 2, change "the addition" to --an addition--.
    In column 9 at line 17 (approx.), In Claim 2, change "or the" to --or a--.

Signed and Sealed this
Fifth Day of July, 2016

Michelle K. Lee
*Director of the United States Patent and Trademark Office*

CERTIFICATE OF CORRECTION (continued)
U.S. Pat. No. 8,990,835 B2

In column 9 at line 30, In Claim 2, change "comprise" to --comprises--.

In column 9 at line 43, In Claim 7, after "on" delete "the".

In column 9 at line 58, In Claim 7, change "proving" to --providing--.

In column 10 at line 19, In Claim 8, after "in" delete "the".

In column 10 at line 33, In Claim 9, change "application," to --application--.